US012176684B2

(12) United States Patent
Ezaki et al.

(10) Patent No.: US 12,176,684 B2
(45) Date of Patent: Dec. 24, 2024

(54) DISCHARGE DEVICE

(71) Applicant: SHARP KABUSHIKI KAISHA, Sakai (JP)

(72) Inventors: Tetsuya Ezaki, Sakai (JP); Nobuyuki Ohe, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/287,242

(22) PCT Filed: Mar. 30, 2022

(86) PCT No.: PCT/JP2022/015975
§ 371 (c)(1),
(2) Date: Oct. 17, 2023

(87) PCT Pub. No.: WO2022/230580
PCT Pub. Date: Nov. 3, 2022

(65) Prior Publication Data
US 2024/0204489 A1 Jun. 20, 2024

(30) Foreign Application Priority Data
Apr. 30, 2021 (JP) ................................ 2021-077416

(51) Int. Cl.
*H01T 19/04* (2006.01)

(52) U.S. Cl.
CPC .................................... *H01T 19/04* (2013.01)

(58) Field of Classification Search
CPC ......... H01T 19/04; H01T 23/00; H01T 19/02; A61L 9/22
See application file for complete search history.

(56) References Cited

FOREIGN PATENT DOCUMENTS

| | | | | |
|---|---|---|---|---|
| JP | S52-130065 U | 10/1977 | | |
| JP | 2017-021982 A | 1/2017 | | |
| JP | 2019-102295 A | 6/2019 | | |
| WO | WO-2017010113 A1 * | 1/2017 | ............... | A61L 9/22 |

OTHER PUBLICATIONS

WO2017010113 machine translation (Year: 2017).*

* cited by examiner

*Primary Examiner* — Anne M Hines
*Assistant Examiner* — Jose M Diaz
(74) *Attorney, Agent, or Firm* — ScienBiziP, P.C.

(57) ABSTRACT

A discharge device includes a discharge member, a support portion, and a protruding piece. The discharge member discharges when a voltage is applied thereto. The support portion has a flat-plate shape and supports the discharge member. The protruding piece is inclined relative to the support portion and protrudes in a direction intersecting the support portion. The support portion preferably includes a holding portion that holds the discharge member. The discharge member is preferably a bundle of fibers. The support portion preferably includes a pair of first surfaces. The holding portion preferably holds the discharge member on one first surface of the pair of first surfaces. The protruding piece is preferably inclined, relative to the support portion, in a direction in which the discharge member is located.

6 Claims, 15 Drawing Sheets

DISCHARGE DEVICE

TECHNICAL FIELD

The present invention relates to a discharge device.

BACKGROUND ART

A discharge device described in PTL 1 includes a casing, a plurality of discharge electrode needles, a high-voltage substrate, and a filler. The casing houses the plurality of discharge electrode needles, the high-voltage substrate, and the filler. A high voltage is applied to the plurality of discharge electrode needles to generate ions. The high-voltage substrate is connected to the plurality of discharge electrode needles. The high-voltage substrate is connected to an external high-voltage power source. The filler is an insulating resin.

CITATION LIST

Patent Literature

PTL 1: JP 2019-102295 A

SUMMARY OF INVENTION

Technical Problem

Unfortunately, in the discharge device described in PTL 1, when the discharge electrode needle is connected to the high-voltage substrate, the posture of the electrode easily changes, and as a result, the efficiency of the operation of connecting the electrode to the substrate is reduced.

The present invention is made in view of the problem described above, and an object thereof is to provide a discharge device that can improve the efficiency of an operation of connecting a support portion to the substrate.

Solution to Problem

According to an aspect of the present invention, a discharge device includes a discharge member, a support portion, and a protruding piece. The discharge member discharges when voltage is applied to the discharge member. The support portion has a flat-plate shape and supports the discharge member. The protruding piece is inclined relative to the support portion and protrudes in a direction intersecting the support portion.

Advantageous Effects of Invention

A discharge device according to the present invention can improve the efficiency of an operation of connecting a support portion to a substrate.

DESCRIPTION OF EMBODIMENTS

Figure 1:
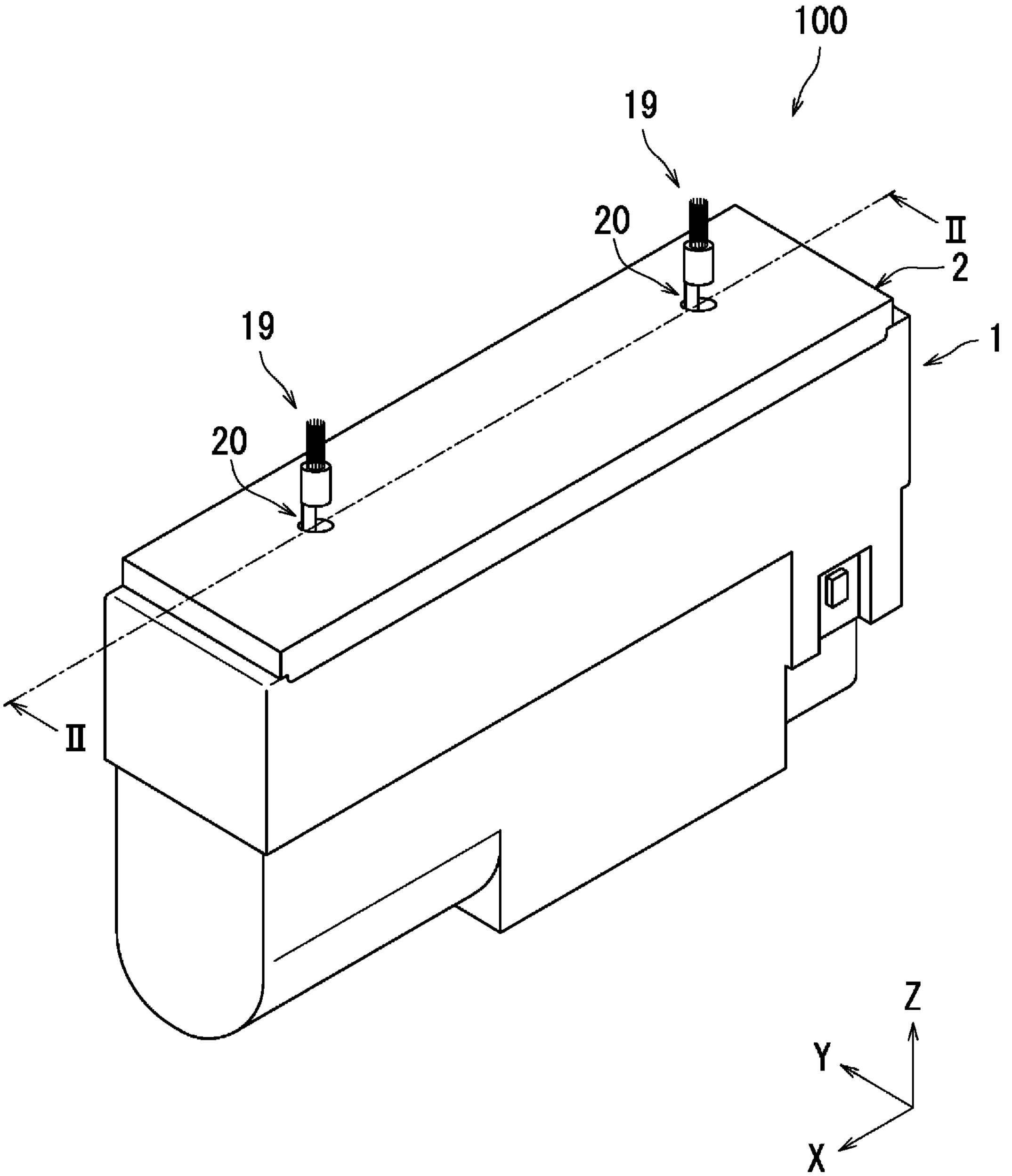
FIG. 1 is a diagram illustrating a discharge device according to an embodiment of the present invention.

Embodiments of the present invention will be described hereinafter with reference to the accompanying drawings. Note that, in the drawings, the same or equivalent components are denoted by the same reference signs and description thereof will not be repeated. In the embodiments of the present invention, an X axis, a Y axis, and a Z axis are orthogonal to each other, the X axis and the Y axis are parallel to a horizontal plane, and the Z axis is parallel to a vertical line.

First Embodiment

A discharge device 100 according to a first embodiment of the present invention will be described with reference to FIG. 1 to FIG. 4. First, with reference to FIG. 1, the discharge device 100 according to the first embodiment will be described. FIG. 1 is a diagram illustrating the discharge device 100 according to the first embodiment. The discharge device 100 discharges to generate active species (including radicals), ions, and ozone.

The discharge device 100 includes a plurality of electrodes 19, a housing portion 1, and a cover portion 2. The plurality of electrodes 19 discharge as a result of a voltage being applied thereto. The plurality of electrodes 19 are, for example, two electrodes 19. That is, the plurality of electrodes 19 are, for example, a pair of the electrodes 19. A part of each of the pair of electrodes 19 penetrates the cover portion 2.

The housing portion 1 houses a part of the pair of electrodes 19. The housing portion 1 is a box-shaped housing. The housing portion 1 is a housing having insulating properties. The housing portion 1 is formed of, for example, resin.

The cover portion 2 covers a portion, of the housing portion 1, at which the pair of electrodes 19 are disposed. The cover portion 2 has insulating properties. The cover portion 2 is formed of, for example, resin.

Figure 2:
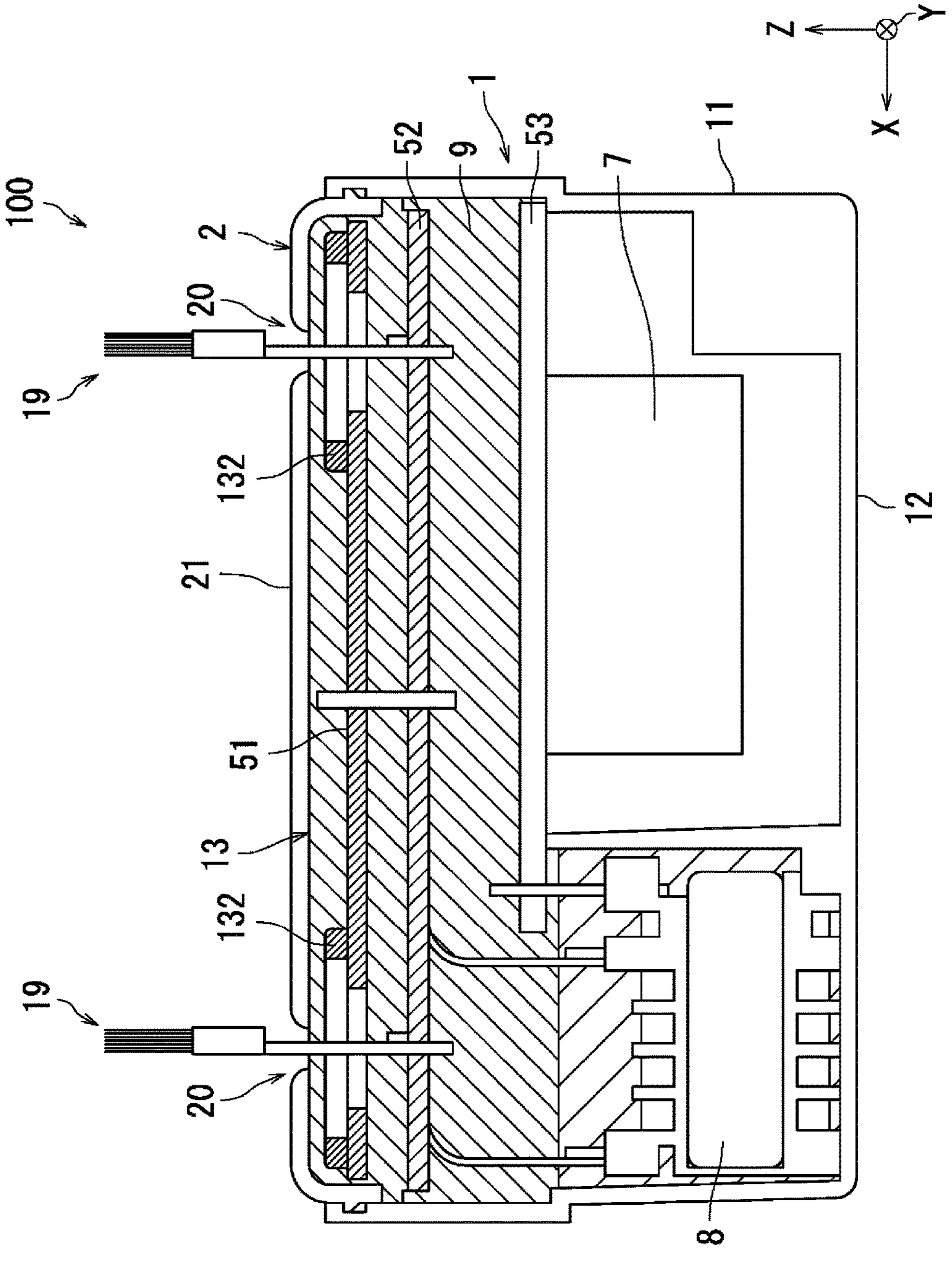
FIG. 2 is a diagram illustrating a cross section of the discharge device illustrated in FIG. 1 taken along a line II-II.

Next, with reference to FIG. 2, the discharge device 100 will be described in detail. FIG. 2 is a diagram illustrating a cross section of the discharge device 100 illustrated in FIG. 1 taken along a line II-II. As illustrated in FIG. 2, the discharge device 100 further includes a plurality of induction electrodes 132, a first substrate 51, a second substrate 52, a third substrate 53, an electronic component 7, a transformer 8, and an insulating member 9.

As illustrated in FIG. 2, the housing portion 1 houses the first substrate 51, the second substrate 52, the third substrate 53, the electronic component 7, the transformer 8, and the insulating member 9. The housing portion 1 has a box-shape with an opening 13. The housing portion 1 includes a side wall portion 11 and a bottom wall portion 12.

The bottom wall portion 12 supports the side wall portion 11. The transformer 8 and the electronic component 7 are disposed at the bottom wall portion 12. The side wall portion 11 surrounds the bottom wall portion 12. The side wall portion 11 extends from the bottom wall portion 12 toward the opening 13.

Each of the plurality of induction electrodes 132 forms an electric field between the induction electrode 132 and the electrode 19. The plurality of induction electrodes 132 are, for example, two induction electrodes 132. That is, the plurality of induction electrodes 132 are, for example, a pair of the induction electrodes 132. Each of the pair of induction electrodes 132 is disposed around the electrode 19. The induction electrode 132 is ring-shaped or substantially ring-shaped electrode. Being substantially ring-shaped means that there is a gap in the induction electrode 132 in the circumferential direction thereof. The pair of induction electrodes 132 are connected to the first substrate 51.

The pair of electrodes 19 are, for example, brush-shaped electrodes. The pair of electrodes 19 are connected to the second substrate 52. When a high voltage is applied to the pair of electrodes 19, corona is generated. That is, each of the pair of electrodes 19 discharges to generate ions.

For example, one electrode 19 of the pair of electrodes 19 emits positive ions through discharging. The positive ion is a cluster ion ($H^+(H_2O)_m$ (here, m is any integer equal to or greater than zero)) with a plurality of water molecules clustered around a hydrogen ion ($H^+$). Furthermore, the other electrode 19 of the pair of electrodes 19 emits negative ions through discharging. The negative ion is a cluster ion ($O_2$—$(H_2O)_n$, (here, n is any integer equal to or greater than zero)) with a plurality of water molecules clustered around an oxygen ion ($O_2$—).

When the positive ions and the negative ions are emitted, the greater a gap between the electrode 19 emitting the positive ions and the electrode 19 emitting the negative ions, the greater the number of ions emitted from each of the electrodes 19.

For example, the positive ions and the negative ions that have been emitted surround a mold fungus floating in the air and cause a chemical reaction on the surface of the mold fungus. The chemical reaction produces hydroxyl radicals (·OH) of an active species. The action of hydroxyl radicals (·OH) then removes the mold fungi.

The pair of induction electrodes 132 are disposed at the first substrate 51. The first substrate 51 is electrically connected to the pair of induction electrodes 132. The first substrate 51 is a so-called printed substrate. The first substrate 51 is disposed closer to the opening 13 than the second substrate 52 is. The first substrate 51 is connected to the transformer 8 by a lead wire. The first substrate 51 is connected to the third substrate 53 via the transformer 8.

The pair of electrodes 19 are disposed at the second substrate 52. The second substrate 52 is electrically connected to the pair of electrodes 19. The second substrate 52 is a so-called printed substrate. The second substrate 52 is disposed closer to the opening 13 than the third substrate 53 is. The second substrate 52 is connected to the transformer 8 by a lead wire. The second substrate 52 is connected to the third substrate 53 via the transformer 8.

A circuit is formed at the third substrate 53. Specifically, a circuit for electrically connecting the third substrate 53 to the first substrate 51, the second substrate 52, the transformer 8, and the electronic component 7 is formed at the third substrate 53. More specifically, the third substrate 53 is electrically connected to the transformer 8 and the electronic component 7 by a pattern. Specifically, the third substrate 53 is connected to a terminal of the transformer 8. The third substrate 53 is disposed between the electronic component 7 and the second substrate 52.

Examples of the electronic component 7 include a power supply terminal, a diode, a resistance element, a transistor, a capacitor, and the like. The power supply terminal is connected to an external power source via the pattern.

The transformer 8 boosts the voltage generated by the electronic component 7 and applies the generated high voltage to the pair of electrodes 19.

The insulating member 9 has insulating properties. The insulating member 9 is, for example, urethane resin or epoxy resin. The insulating member 9 is cured over time, for example. For example, the insulating member 9 is cured by temperature (heat) or light (ultraviolet light).

The cover portion 2 covers the opening 13 of the housing portion 1. The cover portion 2 includes a main body portion 21 and a pair of holes 20. The pair of electrodes 19 are inserted into the pair of holes 20, respectively.

Figure 3:
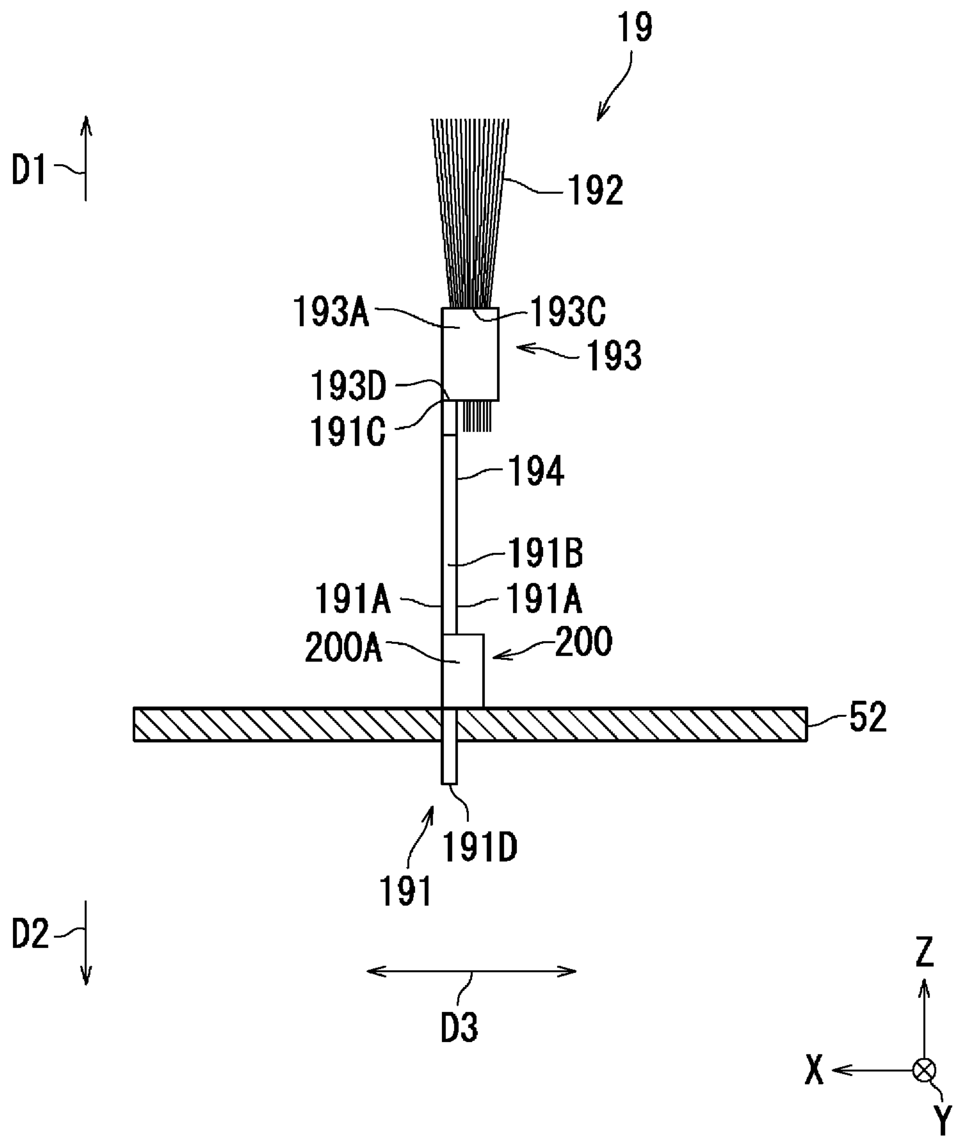
FIG. 3 is a diagram illustrating an electrode illustrated in FIG. 2 in an enlarged manner.
Figure 4:
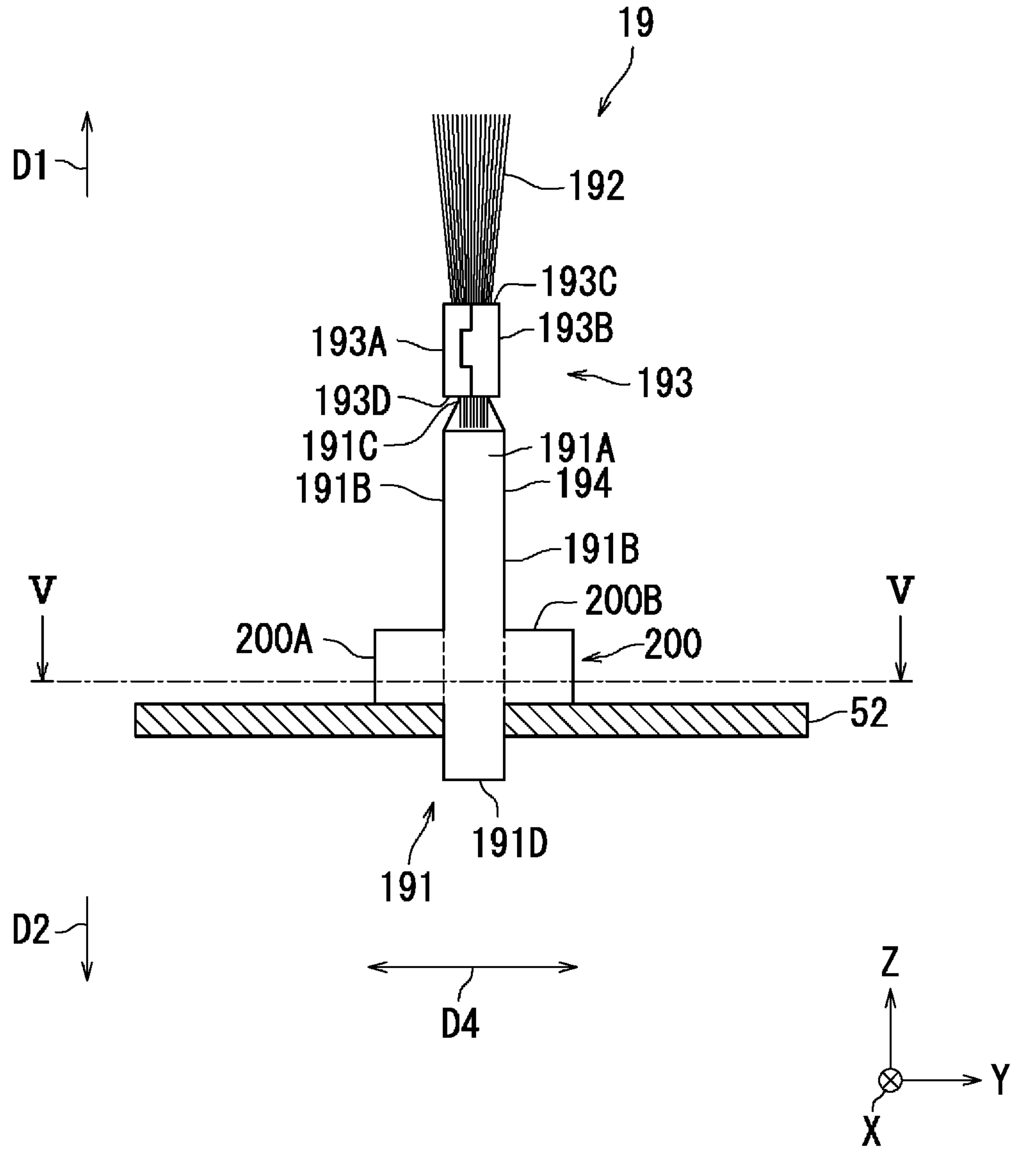
FIG. 4 is a diagram illustrating the electrode illustrated in FIG. 3 viewed from another angle.
Figure 5:
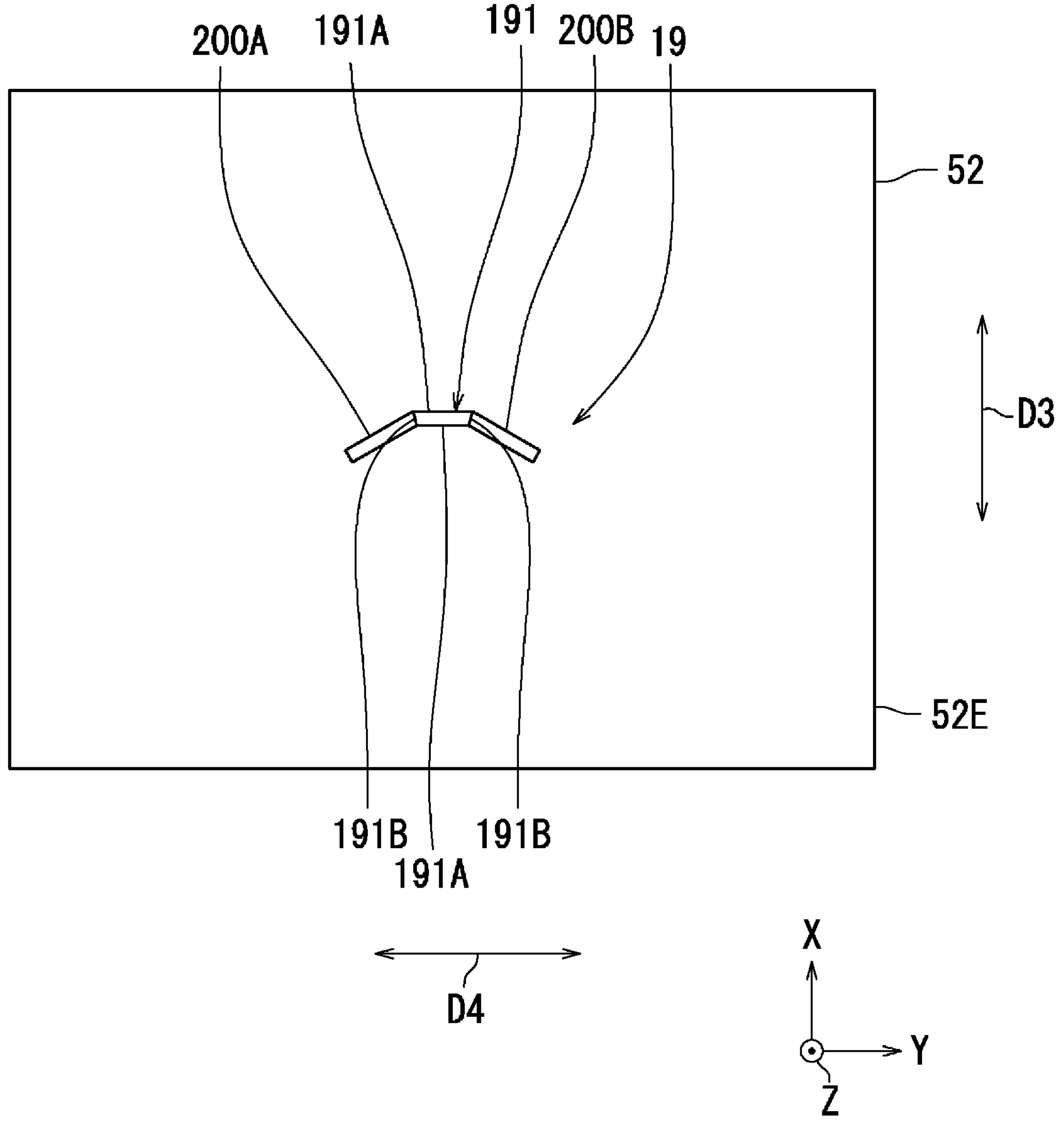
FIG. 5 illustrates a cross section of the electrode illustrated in FIG. 4 taken along a line V-V.

Next, with reference to FIG. 2 to FIG. 5, the discharge device 100 will be described in more detail. FIG. 3 is a diagram illustrating the electrode 19 illustrated in FIG. 2 in an enlarged manner. In order to facilitate understanding of the invention, FIG. 3 and FIG. 4 illustrate the electrode 19 and the second substrate 52. FIG. 4 is a diagram of the electrode 19 illustrated in FIG. 3 viewed from another angle. FIG. 5 illustrates a cross section of the electrode 19 illustrated in FIG. 4 taken along a line V-V.

As illustrated in FIG. 3 and FIG. 4, the electrode 19 includes a support portion 191 and a discharge member 192.

The support portion 191 supports the discharge member 192. A voltage is applied to the support portion 191 as well as to the discharge member 192. The support portion 191 includes a main body portion 194. The main body portion 194 penetrates the second substrate 52. Furthermore, the main body portion 194 penetrates the insulating member 9, as illustrated in FIG. 2.

As illustrated in FIG. 4, the main body portion 194 has a flat-plate shape. The main body portion 194 includes a pair of first surfaces 191A opposing each other, a pair of second surfaces 191B opposing each other, a first support end portion 191C, and a second support end portion 191D. The pair of second surfaces 191B are disposed between one of the first surfaces 191A and the other of the first surfaces 191A. The width of the first surface 191A is greater than the width of the second surface 191B. That is, the area of the first surface 191A is larger than the area of the second surface 191B. In other words, the main body portion 194 is a thin plate.

The first support end portion 191C is an end portion in a first direction D1. The first direction D1 indicates a direction from the second substrate 52 toward the discharge member 192. The first support end portion 191C penetrates the insulating member 9 and protrudes to the outside of the insulating member 9.

The second support end portion 191D is an end portion in a second direction D2. The second support end portion 191D is connected to the second substrate 52. The second direction D2 indicates a direction from the discharge member 192 toward the second substrate 52. A part of the second support end portion 191D penetrates the second substrate 52.

The discharge member 192 discharges as a result of a voltage being applied thereto.

The discharge device 100 further includes a protruding piece 200. The protruding piece 200 protrudes in a direction intersecting the support portion 191. As illustrated in FIG. 4 and FIG. 5, the protruding piece 200 is inclined relative to the support portion 191. Therefore, in connecting the support portion 191 to the second substrate 52, it is possible to inhibit the support portion 191 from swinging relative to the second substrate 52 and to thus inhibit the posture of the support portion 191 from changing. As a result, the efficiency of the operation of connecting the support portion 191 to the second substrate 52 is improved.

In addition, in connecting the support portion to the second substrate, if the support portion is fixed to the second substrate in a posture inclined relative to the second substrate, there is a possibility that the number of ions desired by a designer may not be generated. That is, when the posture of the support portion is inclined, the distance between the electrode and the insulating member is reduced, and as a result, the strength of the electric field is weakened. When the strength of the electric field is weakened, the number of ions is reduced. In other words, in the present invention, it is possible to inhibit the support portion 191 from swinging relative to the second substrate 52. Therefore, in fixing the support portion 191 to the second substrate 52, it is possible to inhibit the posture of the support portion 191 from being inclined. As a result, the number of ions desired by the designer can be generated in a stable manner.

The protruding piece 200 extends from the support portion 191. The protruding piece 200 is made of the same material as that of the support portion 191 and is integrally molded with the support portion 191. The protruding piece 200 is bent at a predetermined angle so as to be inclined relative to the support portion 191. That is, the protruding piece 200 is bent relative to the support portion 191. Note that the angle of the protruding piece 200 relative to the support portion 191 is set to any chosen angle by a designer.

Specifically, in connecting the support portion 191 to the second substrate 52, the second support end portion 191D of the support portion 191 is inserted into a through hole of the second substrate 52. Specifically, the second support end portion 191D is inserted into the through hole of the second substrate 52 until the protruding piece 200 abuts against the second substrate 52. In inserting the second support end portion 191D into the through hole of the second substrate 52, the protruding piece 200 functions as a positioning member. That is, by inserting the second support end portion 191D to a position at which the protruding piece 200 abuts against the second substrate 52, the position of the discharge member 192 becomes uniform among a plurality of the discharge devices 100. Thus, it is possible to inhibit the discharge performance of the discharge member 192 from varying among the discharge devices 100 due to a difference in the position of the discharge member 192 or the inclination of the discharge member 192.

Furthermore, because the protruding piece 200 is inclined relative to the support portion 191, when the second support end portion 191D is inserted into the through hole of the second substrate 52, it is possible to inhibit the electrode 19 from falling toward the second substrate 52 and thus inhibit the posture of the support portion 191 changing as a result. For example, the protruding piece 200 intersects the support portion 191 at the angle of "30 degrees".

When the protruding piece 200 abuts against the second substrate 52, the support portion 191 stands by itself. That is, in soldering the second support end portion 191D to the second substrate 52, it is possible to inhibit the posture of the support portion 191 from changing. In other words, it is possible to reduce an operation to be done by an operator to stop the soldering operation and return the posture of the support portion 191 to its original posture each time the posture of the support portion 191 changes. As a result, the efficiency of the operation of connecting the support portion 191 to the second substrate 52 is improved.

Furthermore, because the protruding piece 200 protruding from the support portion 191 is inclined relative to the support portion 191, the strength of the support portion 191 is improved. In other words, bending of the support portion 191 due to an external force can be reduced. For example, the protruding piece 200 reduces the bending of the support portion 191 in a third direction D3 and a fourth direction D4 illustrated in FIG. 5. The third direction D3 indicates a direction along a direction from the one of the first surfaces 191A toward the other of the first surfaces 191A. The fourth direction D4 indicates a direction along a direction from one of the second surfaces 191B toward the other of the second surfaces 191B. The fourth direction D4 intersects the third direction D3.

The reduction in the bending of the support portion 191 is particularly effective in manufacturing the discharge device 100. For example, as illustrated in FIG. 2, this is particularly important in the manufacturing process up to a point at which the insulating member 9 is filled around the protruding piece 200 and the support portion 191 is fixed. In the manufacturing process, there is a case in which a work tool or the like may come into contact with the electrode 19. However, the bending of the support portion 191 according to the present invention can be reduced by the protruding piece 200. Thus, the bending of the support portion 191 can be suppressed.

Next, the electrode 19 will be described in more detail with reference to FIG. 2 to FIG. 5. As illustrated in FIG. 3 and FIG. 4, the discharge member 192 is a plurality of fibers. That is, the discharge member 192 is a bundle of fibers. Each of the plurality of fibers is a conductor. The discharge member 192 is, for example, carbon fibers. The discharge member 192 may be, for example, metal, conductive fibers, or conductive resin. A part of the plurality of fibers of the discharge member 192 spread at the time of discharging.

The support portion 191 of the electrode 19 further includes a holding portion 193. The holding portion 193 holds the discharge member 192. The holding portion 193 extends from the support portion 191. The holding portion 193 is made of the same material as that of the support portion 191 and is integrally molded with the support portion 191. Furthermore, the holding portion 193 bundles the discharge member 192 formed by the plurality of fibers. That is, the holding portion 193 holds the discharge member 192 so that the discharge member 192 has a brush-shape.

The holding portion 193 includes a first holding piece 193A and a second holding piece 193B. The first holding piece 193A and the second holding piece 193B hold a base end portion of the discharge member 192. Specifically, the first holding piece 193A and the second holding piece 193B hold the base end portion of the discharge member 192 by crimping deformation. As a result of the first holding piece 193A and the second holding piece 193B holding the base end portion of the discharge member 192, the discharge member 192 has the brush-shape.

Furthermore, the holding portion 193 has a first holding end portion 193C and a second holding end portion 193D.

The first holding end portion 193C is an end portion proximate to the discharge member 192. That is, the first holding end portion 193C is an end portion in the first direction D1.

The second holding end portion 193D is an end portion proximate to the insulating member 9. That is, the second holding end portion 193D is an end portion in the second direction D2. The second holding end portion 193D is continuous with the main body portion 194 of the support portion 191.

As illustrated in FIG. 3, the holding portion 193 holds the discharge member 192 on one first surface 191A of the pair of first surfaces 191A of the support portion 191. In other words, the position of the center of gravity of the support portion 191 is changed toward the one first surface 191A. Thus, the support portion 191 is likely to fall in a direction toward the position at which the holding portion 193 holding the discharge member 192 is disposed.

However, in the discharge device 100 of the present embodiment, as illustrated in FIG. 3, the protruding piece 200 is inclined, relative to the support portion 191, toward a direction in which the discharge member 192 is located. Therefore, the protruding piece 200 can support the support portion 191 that falls in a direction in which the position of the center of gravity of the support portion 191 is present. As a result, it is possible to inhibit the support portion 191 from falling toward the second substrate 52.

As illustrated in FIG. 2 to FIG. 5, the protruding piece 200 includes a first protruding piece 200A and a second protruding piece 200B. The first protruding piece 200A protrudes from one second surface 191B of the pair of second surfaces 191B of the support portion 191. The second protruding piece 200B protrudes from the other second surface 191B of the pair of second surfaces 191B of the support portion 191.

At least one of the first protruding piece 200A or the second protruding piece 200B is inclined, relative to the support portion 191, in a direction in which the discharge member 192 is located. Therefore, at least one of the first protruding piece 200A or the second protruding piece 200B can support the support portion 191. As a result, it is possible to more effectively inhibit the support portion 191 from falling toward the second substrate 52.

Note that, as illustrated in FIG. 5, in the third direction D3, the first protruding piece 200A and the second protruding piece 200B are bent in the same direction. Therefore, when the support portion 191 falls in a direction in which the position of the center of gravity thereof is present, the first protruding piece 200A and the second protruding piece 200B can support the support portion 191. As a result, it is possible to more effectively inhibit the support portion 191 from falling toward the second substrate 52.

First Modified Example

Next, a first modified example of the discharge device 100 according to the first embodiment will be described with reference to FIG. 6 and FIG. 7. The first modified example is mainly different from the first embodiment in the number of protruding pieces 200. Differences between the first modified example and the present embodiment will be described below.

Figure 6:
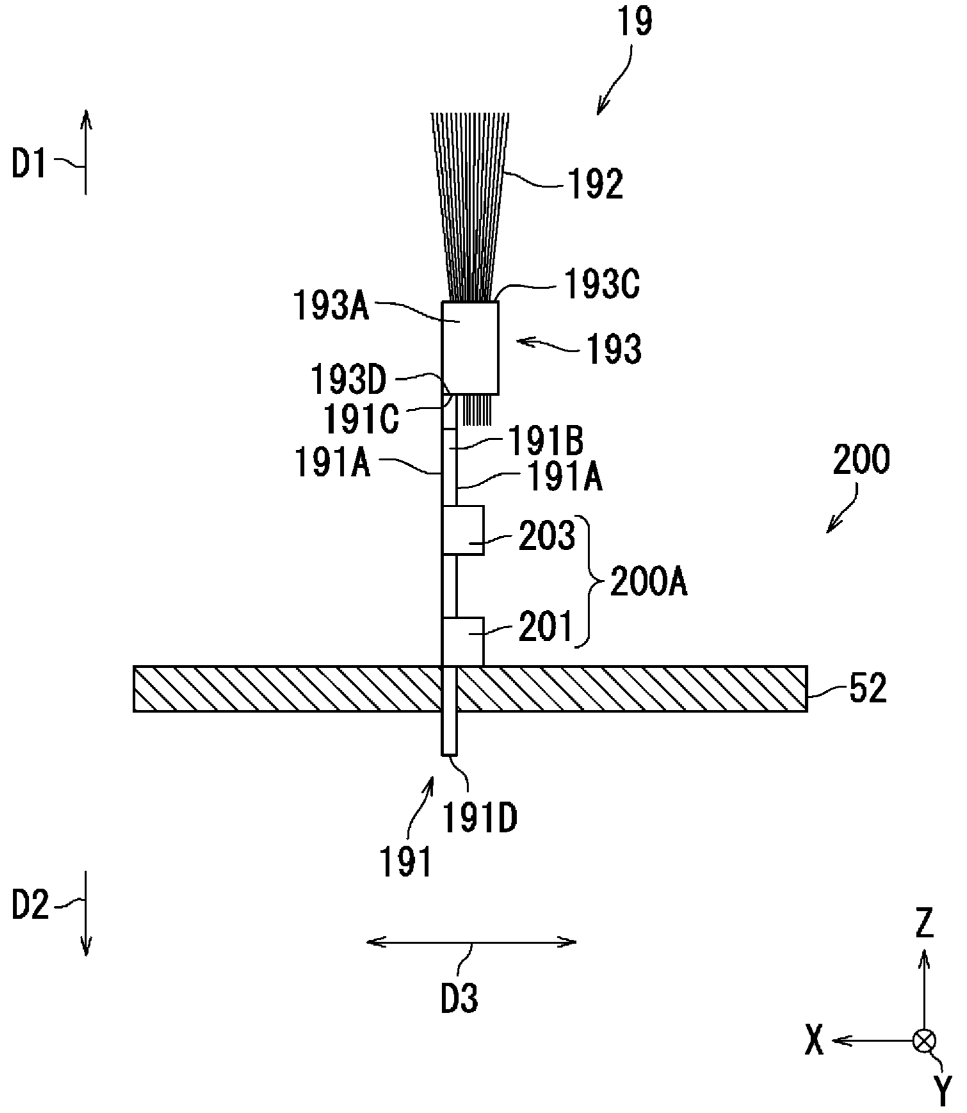
FIG. 6 is a diagram illustrating an electrode of a discharge device according to a first modified example of a first embodiment in an enlarged manner.

FIG. 6 is a diagram illustrating an electrode 19 of a discharge device 100 according to the first modified example of the first embodiment in an enlarged manner. FIG. 7 is a diagram of the electrode 19 illustrated in FIG. 6 viewed from another angle. In order to facilitate understanding of the invention, FIG. 6 and FIG. 7 illustrate the electrode 19 and the second substrate 52.

Figure 7:
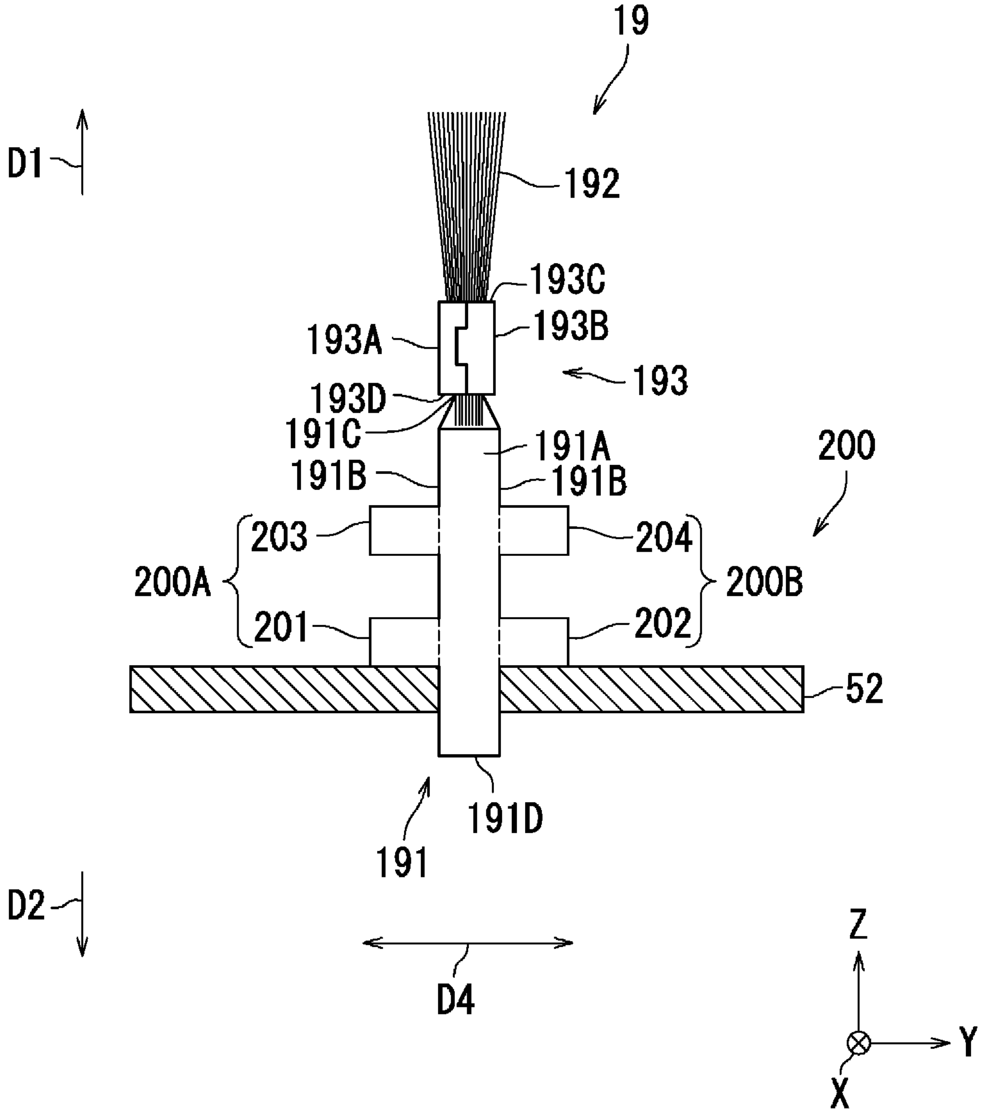
FIG. 7 is a diagram of the electrode illustrated in FIG. 6 viewed from another angle.

As illustrated in FIG. 6 and FIG. 7, a protruding piece 200 of the first modified example includes a first protruding piece 200A and a second protruding piece 200B. The first protruding piece 200A includes a first piece 201 and a third piece 203. The second protruding piece 200B includes a second piece 202 and a fourth piece 204.

The first piece 201 protrudes from one second surface 191B of the pair of second surfaces 191B of the support portion 191. The third piece 203 protrudes from the one second surface 191B of the pair of second surfaces 191B of the support portion 191 at a position different from that of the first piece 201. The third piece 203 is located between the first piece 201 and the discharge member 192.

The second piece 202 protrudes from the other second surface 191B of the pair of second surfaces 191B of the support portion 191. The fourth piece 204 protrudes from the other second surface 191B of the pair of second surfaces 191B of the support portion 191 at a position different from that of the second piece 202. The fourth piece 204 is located between the second piece 202 and the discharge member 192.

In other words, the first piece 201 and the third piece 203 are spaced apart from each other. Furthermore, the second piece 202 and the fourth piece 204 are spaced apart from each other. Thus, the first piece 201 and the third piece 203 are not continuous with each other, and the second piece 202 and the fourth piece 204 are not continuous with each other. In other words, portions of the electrode 19 extending long in the fourth direction D4 are not continuous with each other in the first direction D1. Therefore, in soldering the support portion 191 to the second substrate 52, it is possible to reduce the speed at which the heat transferred from the soldering iron to the support portion 191 moves along the electrode 19. That is, when a portion of the support portion 191 between the first piece 201 and the second piece 202 is heated, the speed at which the heat transferred to the support portion 191 moves toward the discharge member 192 can be reduced. As a result, it is possible to improve the efficiency of soldering the support portion 191 to the second substrate 52.

As illustrated in FIG. 7, in the fourth direction D4, a third portion at which the width of the electrode 19 is narrowed is located between a first portion at which the width of the electrode 19 is widened and a second portion at which the width of the electrode 19 is widened. The first portion is a portion having a length including the first piece 201, the second piece 202, and the support portion 191 of the electrode 19. The second portion is a portion having a length including the third piece 203, the fourth piece 204, and the support portion 191. The third portion is a portion having the length of the support portion 191. Thus, the heat transferred from the soldering iron to the electrode 19 is transferred from the first portion to the third portion. Then, the heat is transferred from the third portion to the second portion. The heat transfer speed at the first portion is different from the heat transfer speed at the third portion. For example, the heat transfer speed at the third portion is slower than the heat transfer speed at the first portion. That is, when heat is applied to the second direction D2 end of the first portion, the heat transfer speed becomes slower at the third portion. Therefore, the speed at which the temperature decreases at the heated portion becomes slower. As a result, a deterioration in the efficiency of the soldering operation due to a decrease in the temperature can be suppressed.

As illustrated in FIG. 6, at least one of the third piece 203 or the fourth piece 204 is inclined, relative to the support portion 191, in a direction in which the discharge member 192 is located. Therefore, it is possible to reinforce a portion of the support portion 191 extending from the holding portion 193 to the first piece 201 and a portion of the support portion 191 extending from the holding portion 193 to the second piece 202. As a result, the bending of the support portion 191 due to an external force can be reduced.

Furthermore, in connecting the support portion 191 to the second substrate 52, the third portion can be pinched by tweezers. Because the third portion is located between the first portion and the second portion, the position of the tweezers pinching the third portion is unlikely to be displaced. Therefore, work efficiency in connecting the support portion 191 to the second substrate 52 is improved.

Second Modified Example

Next, a second modified example of the discharge device 100 according to the first embodiment will be described with reference to FIG. 4 and FIG. 8. The second modified example is mainly different from the first embodiment in that the direction in which the first protruding piece 200A is bent is different from the direction in which the second protruding piece 200B is bent. Differences between the second modified example and the present embodiment will be described below.

Figure 8:
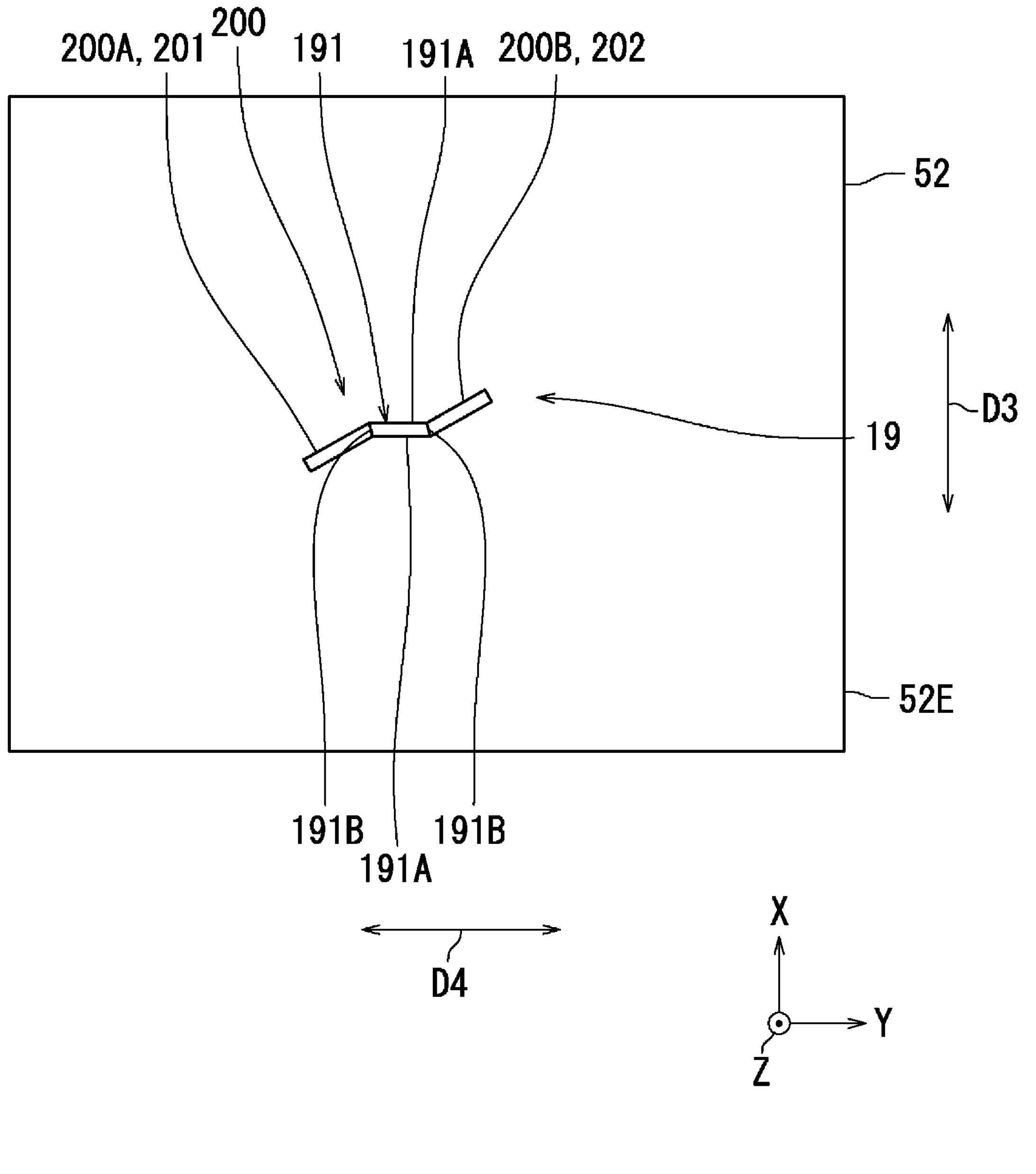
FIG. 8 is a diagram illustrating a cross section of an electrode of a discharge device according to a second modified example of the first embodiment in an enlarged manner.

FIG. 8 is a diagram illustrating a cross section of an electrode 19 of a discharge device 100 according to the second modified example of the first embodiment in an enlarged manner. In order to facilitate understanding of the invention, FIG. 8 illustrates the electrode 19 and the second substrate 52. FIG. 8 is a diagram illustrating the electrode 19 of the discharge device 100 according to the second modified example of the first embodiment. FIG. 8 is a diagram illustrating the electrode 19 as viewed along a direction from the first direction D1 to the second direction D2 illustrated in FIG. 4.

As illustrated in FIG. 8, a protruding piece 200 of the second modified example includes a first protruding piece 200A and a second protruding piece 200B.

The first protruding piece 200A includes a first piece 201. The first piece 201 protrudes from one second surface 191B of the pair of second surfaces 191B of the support portion 191. Furthermore, the first piece 201 is inclined relative to the support portion 191 in a direction from the other of the first surfaces 191A of the support portion 191 toward one of the first surfaces 191A of the support portion 191. That is, the first piece 201 is bent, relative to the support portion 191, in a direction toward the one first surface 191A of the pair of first surfaces 191A of the support portion 191.

The second protruding piece 200B includes a second piece 202. The second piece 202 protrudes from the other second surface 191B of the pair of second surfaces 191B of the support portion 191. Furthermore, the second piece 202 is inclined relative to the support portion 191 in a direction from the one of the first surfaces 191A of the support portion 191 toward the other of the first surfaces 191A of the support portion 191. That is, the second piece 202 is bent, relative to the support portion 191, in a direction toward the other first surface 191A of the pair of first surfaces 191A of the support portion 191.

Thus, as illustrated in FIG. 8, in the third direction D3, the first piece 201 and the second piece 202 are bent in mutually different directions, respectively. Therefore, even when the support portion 191 falls in a direction different from the direction in which the position of the center of gravity of the support portion 191 is present, one of the first piece 201 and the second piece 202 can support the support portion 191. As a result, it is possible to more effectively inhibit the support portion 191 from falling toward the second substrate 52.

Second Embodiment

Next, a discharge device 100 according to a second embodiment will be described with reference to FIG. 9 to FIG. 11. The second embodiment is mainly different from the first embodiment in the shape of the discharge member 192. Differences between the second embodiment and the present embodiment will be described below.

Figure 9:
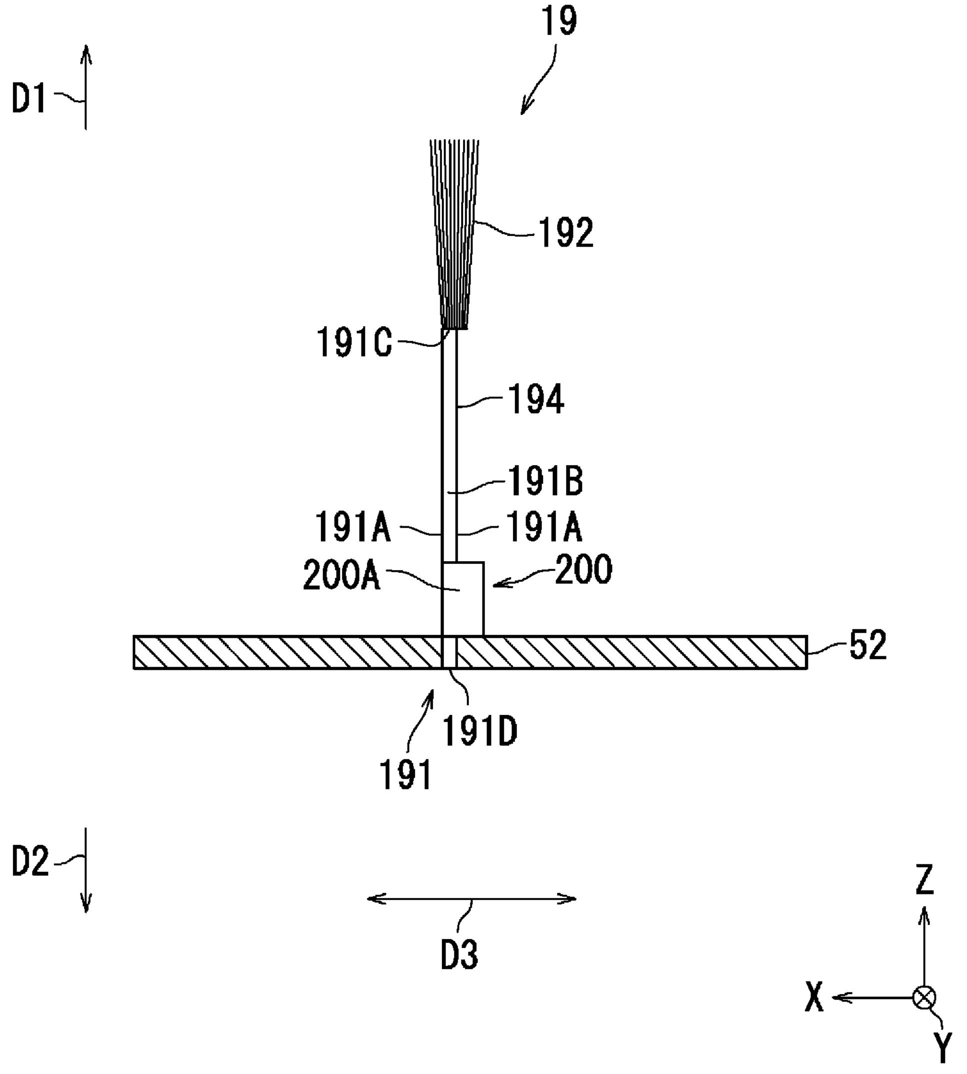
FIG. 9 is a diagram illustrating an electrode of a discharge device according to a second embodiment in an enlarged manner.

FIG. 9 is a diagram illustrating an electrode 19 of the discharge device 100 according to the second embodiment in an enlarged manner. In order to facilitate understanding of the invention, FIG. 10 is a diagram of the electrode 19 illustrated in FIG. 9 viewed from another angle. FIG. 11 is a diagram illustrating a cross section of the electrode 19 illustrated in FIG. 9 taken along a line XI-XI. FIG. 9 to FIG. 11 illustrate the electrode 19 and the second substrate 52.

The discharge device 100 according to the second embodiment includes a plurality of electrodes 19 (not illustrated), a housing portion 1 (not illustrated), and a cover portion 2 (not illustrated). As illustrated in FIG. 9, the electrode 19 includes the support portion 191 and the discharge member 192.

The support portion 191 supports a discharge member 192. The support portion 191 includes a main body portion 194. The main body portion 194 penetrates the second substrate 52. The main body portion 194 has a flat-plate shape. In the fourth direction D4, the width of the main body portion 194 of the second embodiment is wider than the width of the main body portion 194 of the first embodiment. A second support end portion 191D of the support portion 191 according to the second embodiment is fixed to the substrate, for example, by a screw or a socket.

The discharge member 192 discharges as a result of a voltage being applied thereto. The discharge member 192 is a plurality of fibers. The discharge member 192 is a conductor. The discharge member 192 is supported by the support portion 191. The discharge member 192 is, for example, carbon fibers. The discharge member 192 may be, for example, metal, conductive fibers, or conductive resin. A part of the plurality of fibers of the discharge member 192 spread at the time of discharging.

Figure 10:
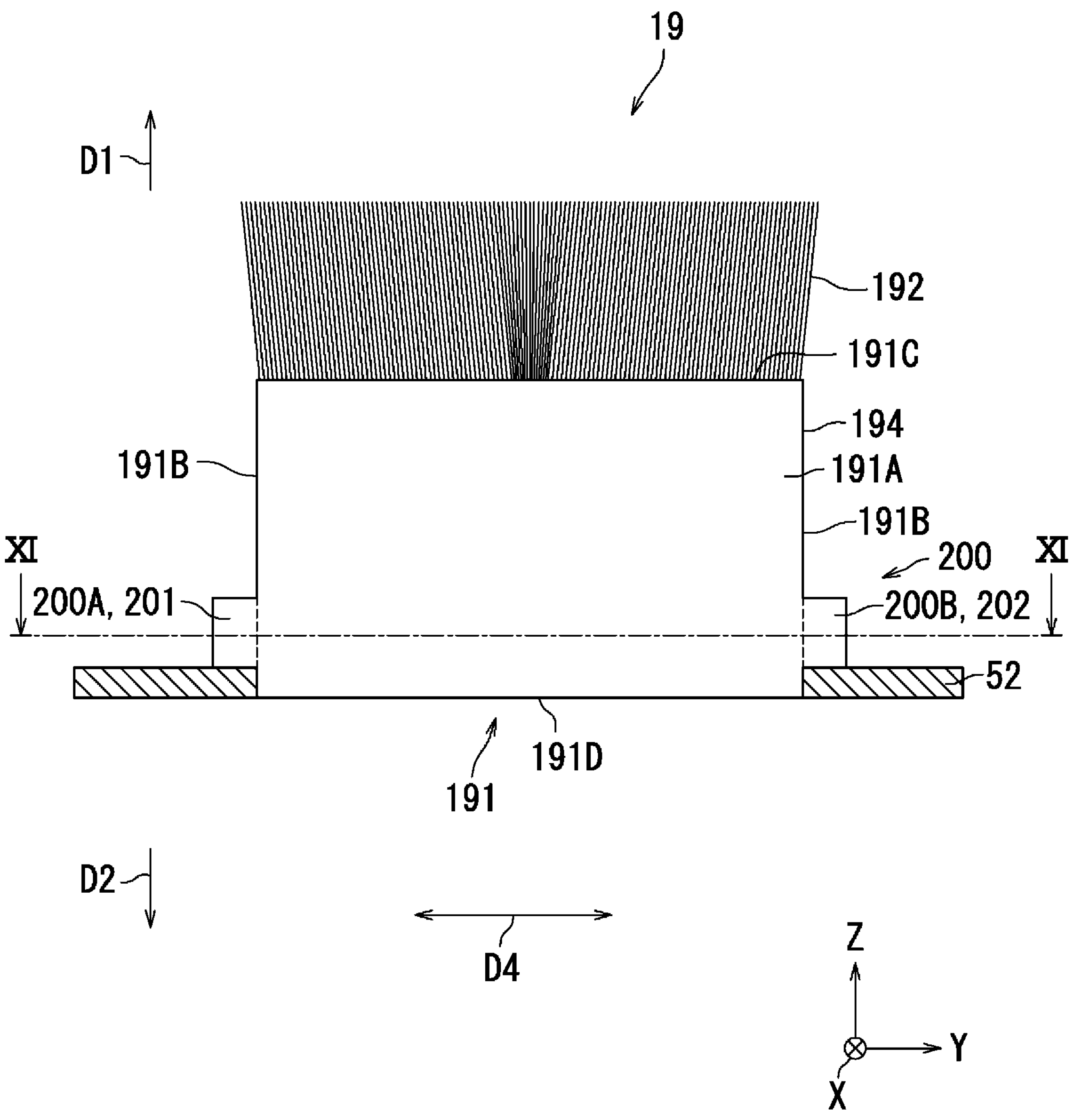
FIG. 10 is a diagram of the electrode illustrated in FIG. 9 viewed from another angle.
Figure 11:
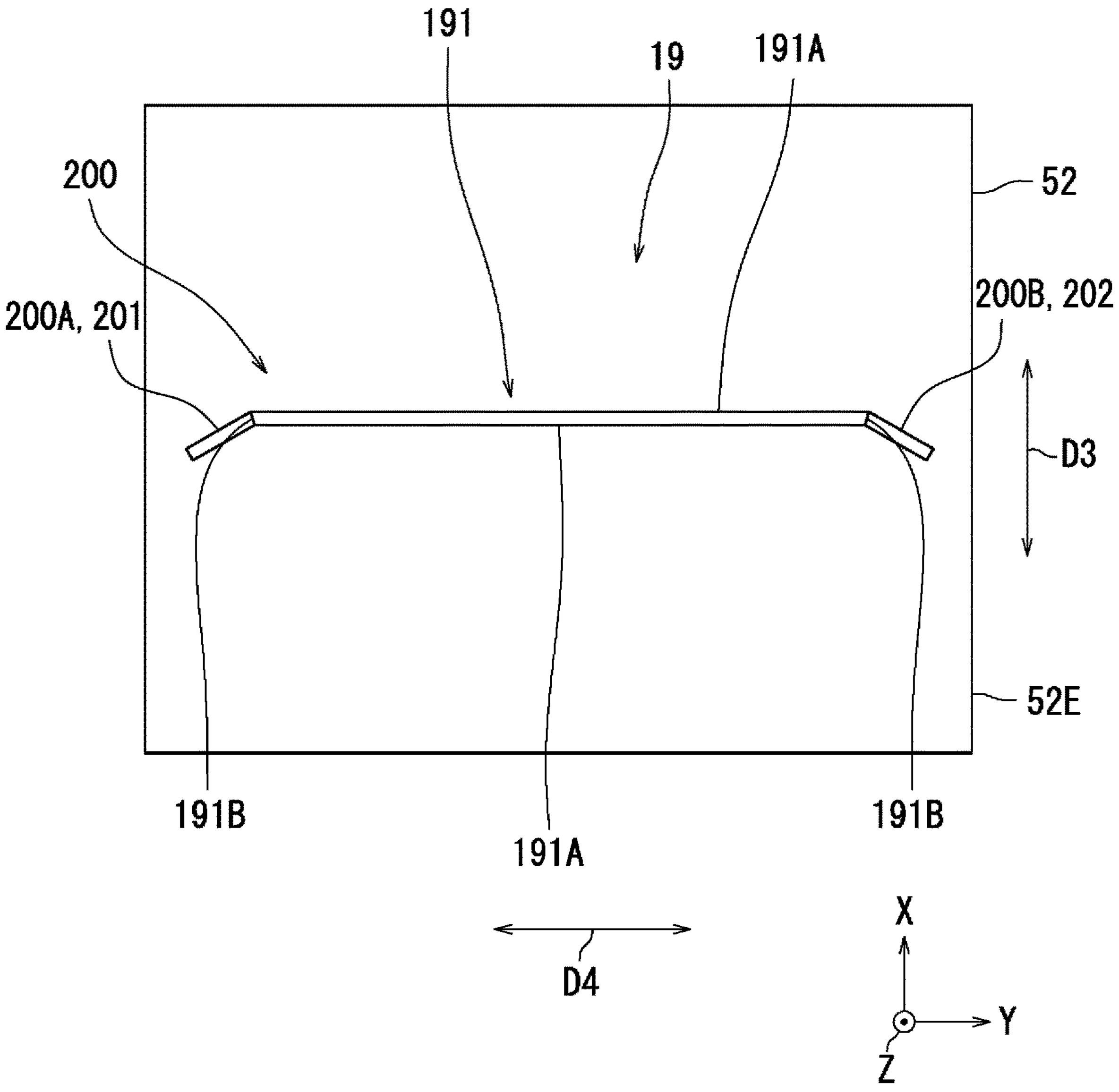
FIG. 11 is a diagram illustrating a cross section of the electrode illustrated in FIG. 10 taken along a line XI-XI.

As illustrated in FIG. 10, the plurality of fibers of the discharge member 192 according to the second embodiment are arranged side by side in the width direction of the support portion 191 in the fourth direction D4. That is, the greater the width of the support portion 191 in the fourth direction D4, the larger the portion of the discharge member 192 supported by the support portion 191.

The discharge device 100 according to the second embodiment further includes a protruding piece 200. The protruding piece 200 protrudes in a direction intersecting the support portion 191. As illustrated in FIG. 11, the protruding piece 200 is inclined relative to the support portion 191. Therefore, in connecting the support portion 191 to the second substrate 52, it is possible to inhibit the support portion 191 from swinging relative to the second substrate 52 and to thus inhibit the posture of the support portion 191 from changing. As a result, the efficiency of the operation of connecting the support portion 191 to the second substrate 52 is improved.

Third Embodiment

Next, a discharge device 100 according to a third embodiment will be described with reference to FIG. 12 to FIG. 14. The third embodiment is mainly different from the first embodiment in the shape of the discharge member 192. Differences between the third embodiment and the present embodiment will be described below.

Figure 12:
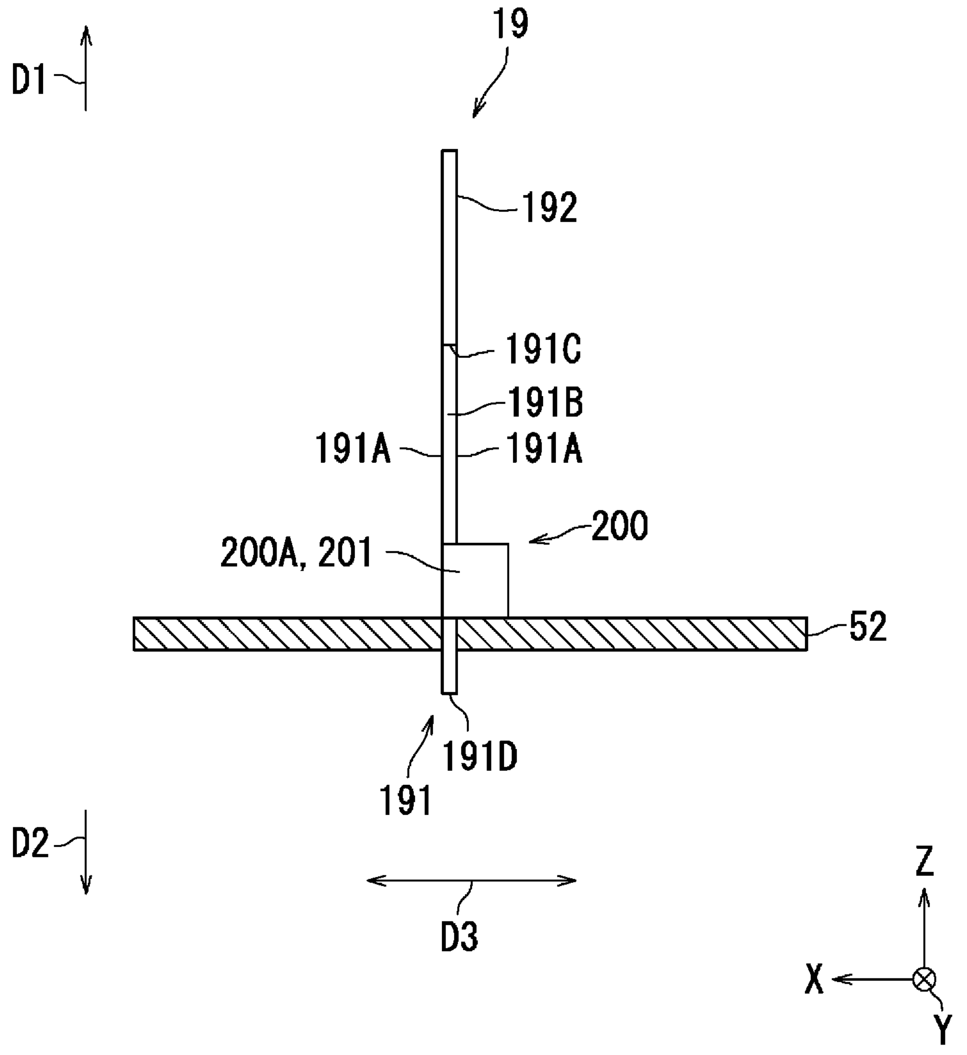
FIG. 12 is a diagram illustrating a discharge device according to a third embodiment.

FIG. 12 is a diagram illustrating an electrode 19 of the discharge device 100 according to the third embodiment in an enlarged manner. In order to facilitate understanding of the invention, FIG. 12 schematically illustrates a cross section of the electrode 19 and the second substrate 52. FIG. 13 is a diagram of the electrode 19 illustrated in FIG. 12 viewed from another angle. FIG. 14 is a diagram illustrating a cross section of the electrode 19 illustrated in FIG. 13 taken along a line XIV-XIV.

The discharge device 100 according to the third embodiment includes a plurality of electrodes 19 (not illustrated), a housing portion 1 (not illustrated), and a cover portion 2 (not illustrated). As illustrated in FIG. 12, the electrode 19 includes a support portion 191 and a discharge member 192.

The support portion 191 supports the discharge member 192. A voltage is applied to the support portion 191 as well as to the discharge member 192. The support portion 191 includes a main body portion 194. The main body portion 194 penetrates the second substrate 52. The main body portion 194 has a flat-plate shape. The main body portion 194 is a thin plate.

Figure 13:
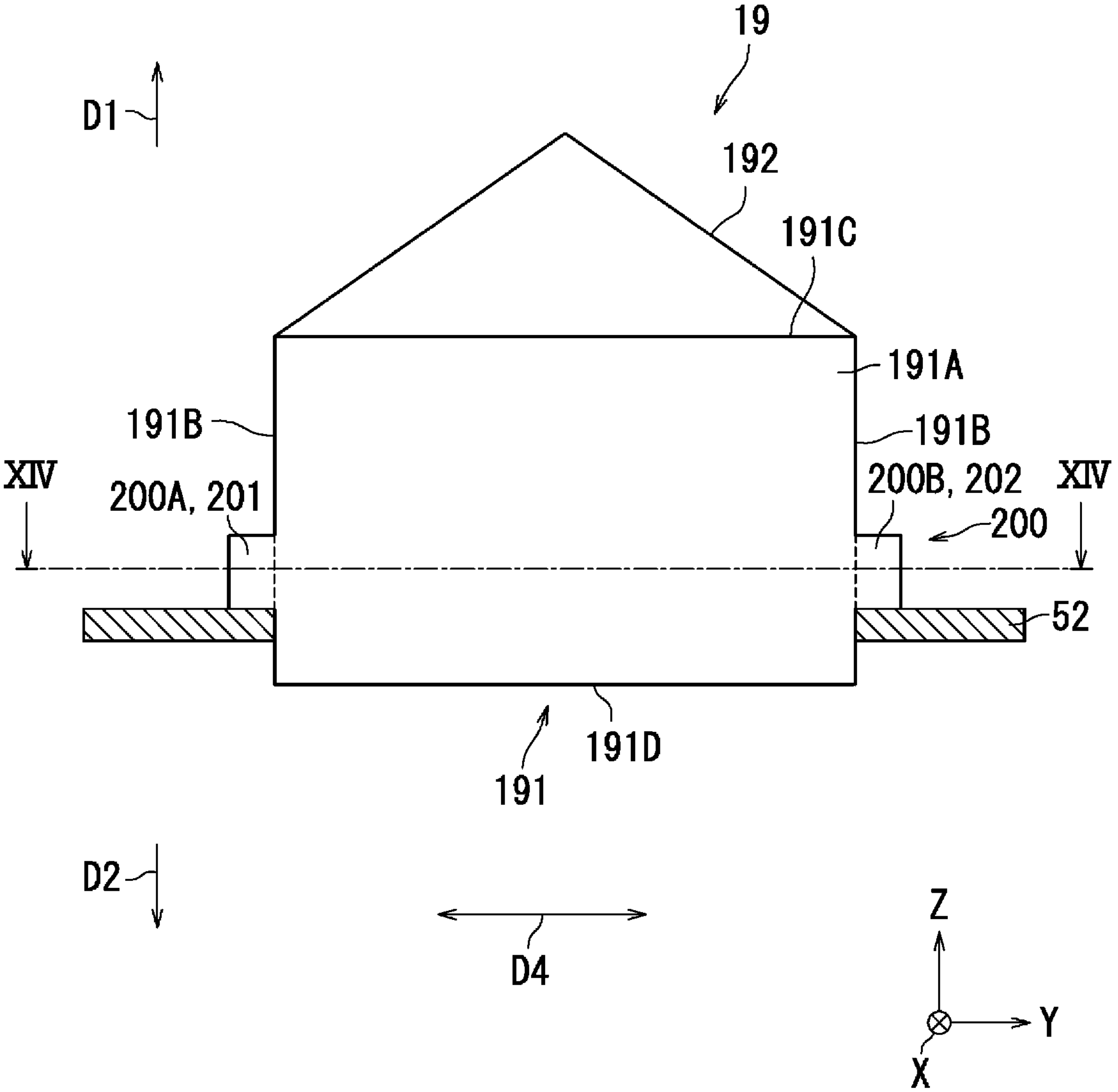
FIG. 13 is a diagram of the electrode illustrated in FIG. 12 viewed from another angle.
Figure 14:
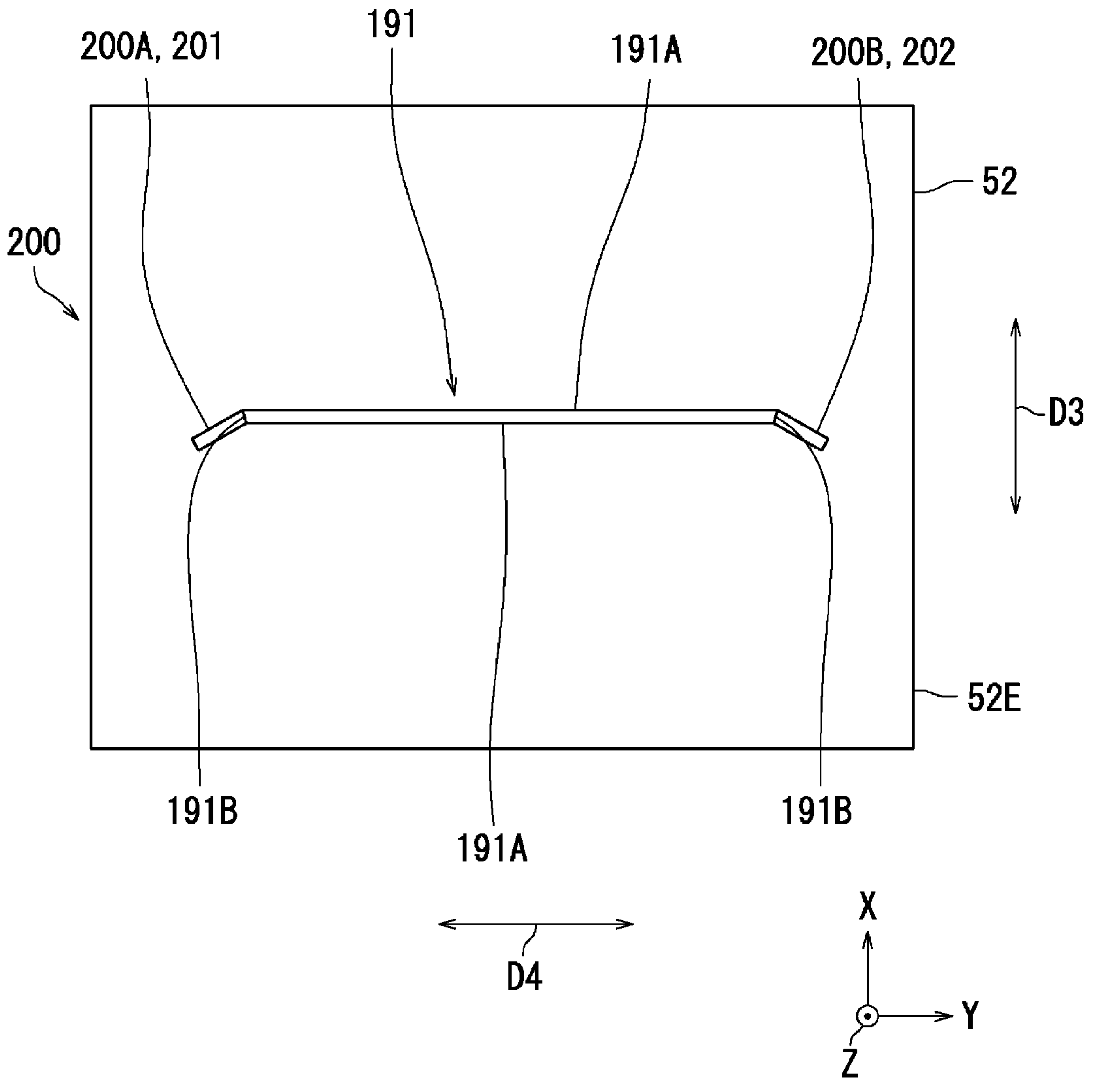
FIG. 14 is a diagram illustrating a cross section of the electrode illustrated in FIG. 13 taken along a line XIV-XIV.

As illustrated in FIG. 13, in the fourth direction D4, the width of the main body portion 194 of the third embodiment is wider than the width of the main body portion 194 of the first embodiment. A second support end portion 191D of the support portion 191 according to the third embodiment is fixed to the substrate, for example, by a screw.

As illustrated in FIG. 12 and FIG. 13, the discharge member 192 is a flat plate having a pointed tip. In other words, the discharge member 192 is a triangular thin plate. The discharge member 192 is a conductor. The discharge member 192 extends from the support portion 191. The discharge member 192 is made of the same material as that of the support portion 191 and is integrally molded with the support portion 191.

The discharge member 192 discharges as a result of a voltage being applied thereto. The discharge device 100 according to the third embodiment further includes a protruding piece 200. The protruding piece 200 protrudes in a direction intersecting the support portion 191. As illustrated in FIG. 14, the protruding piece 200 is inclined relative to the support portion 191. Therefore, in connecting the support portion 191 to the second substrate 52, it is possible to inhibit the support portion 191 from swinging relative to the second substrate 52 and to thus inhibit the posture of the support portion 191 from changing. As a result, the efficiency of the operation of connecting the support portion 191 to the second substrate 52 is improved.

First Modified Example

Next, a first modified example of the discharge device 100 according to the third embodiment will be described with reference to FIG. 15. The first modified example of the third embodiment is mainly different from the third embodiment in the number of discharge members 192. Differences between the first modified example of the third embodiment and the present embodiment will be described below.

Figure 15:
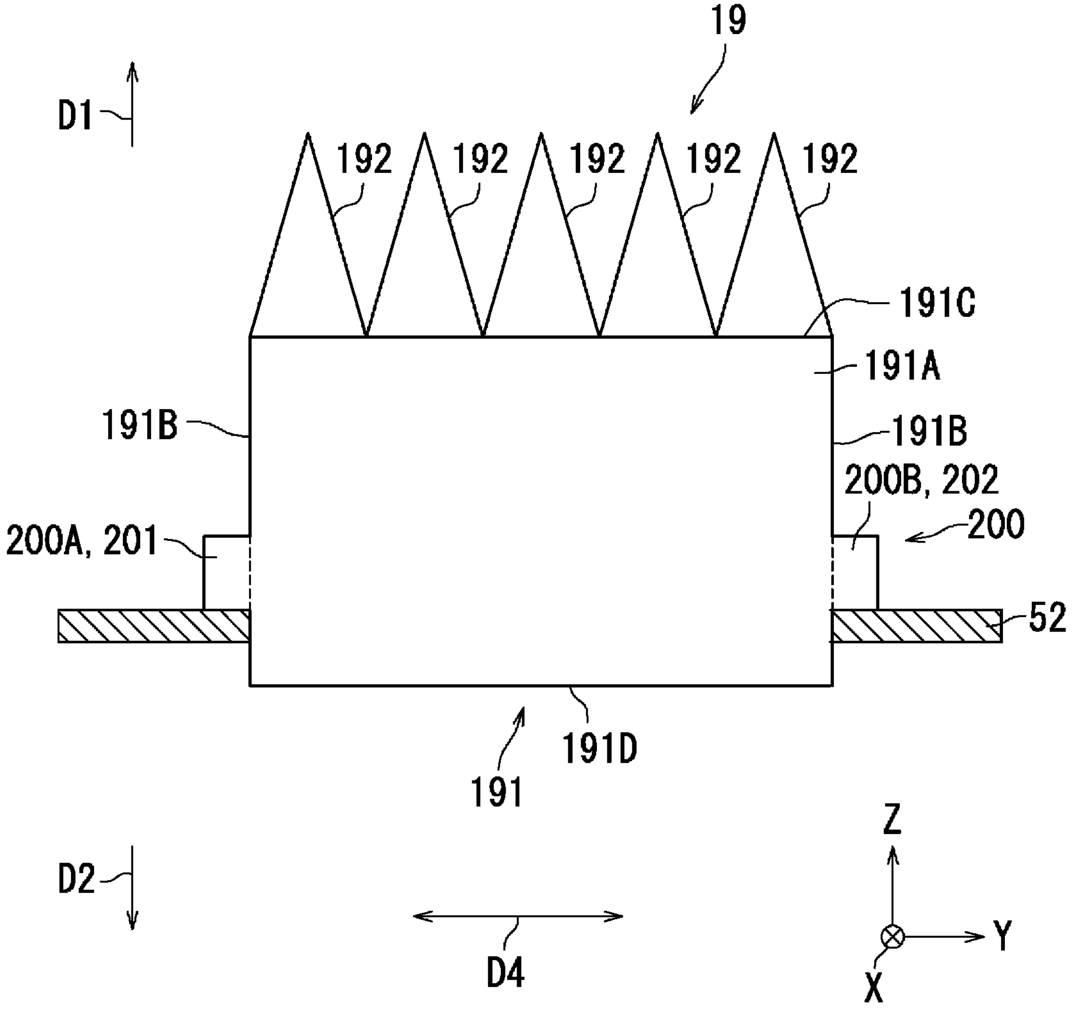
FIG. 15 is a diagram illustrating an electrode of a discharge device according to a first modified example of the third embodiment in an enlarged manner.

FIG. 15 is a diagram illustrating an electrode 19 of a discharge device 100 according to the first modified example of the third embodiment in an enlarged manner. In order to facilitate understanding of the invention, FIG. 15 illustrates the electrode 19 and a second substrate 52.

As illustrated in FIG. 15, a support portion 191 supports a plurality of the discharge members 192.

As illustrated in FIG. 15, each of the plurality of discharge members 192 is a flat plate having a pointed tip. In other words, the discharge member 192 is a triangular thin plate. The plurality of discharge members 192 are arranged side by side at the support portion 191. The discharge member 192 is a conductor. The discharge member 192 extends from the support portion 191. The discharge member 192 is made of the same material as that of the support portion 191 and is integrally molded with the support portion 191.

The discharge device 100 according to the first modified example of the third embodiment further includes a protruding piece 200. The protruding piece 200 protrudes in a direction intersecting the support portion 191. As illustrated in FIG. 15, the protruding piece 200 is inclined relative to the support portion 191. Therefore, in connecting the support portion 191 to the second substrate 52, it is possible to inhibit the support portion 191 from swinging relative to the second substrate 52 and to thus inhibit the posture of the support portion 191 from changing. As a result, the efficiency of the operation of connecting the support portion 191 to the second substrate 52 is improved.

The embodiments of the present invention have been described above with reference to the accompanying drawings. However, the present invention is not limited to the embodiments described above, and the present invention can be implemented in various modes without departing from the gist thereof. Furthermore, various inventions can be formed by appropriately combining a plurality of components disclosed in the embodiments described above. For example, some components may be removed from all of the components described in the embodiments. Furthermore, the components across different embodiments may be appropriately combined. For ease of understanding, the drawings schematically illustrate each component as a main constituent, and the thickness, length, number, spacing, and the like of each component illustrated are different from the actual thickness, length, number, and spacing for convenience of drawing preparation. Furthermore, the speed, material, shape, dimensions, and the like of each component illustrated in the embodiments described above are one example and are not particularly limited, and various modifications can be made within a range that does not substantially deviate from the configuration of the present invention.

(1) The discharge device 100 described in each of the first to third embodiments may be mounted on electronic devices such as an air conditioner, a dehumidifier, a humidifier, an air purifier, a refrigerator, a gas fan heater, an oil fan heater, an electric fan heater, a washing and drying machine, a cleaning machine, a sterilizer, and a microwave oven.

(2) In the discharge device 100 described in the second modified example of the first embodiment, the third piece 203 and the fourth piece 204 may be bent in mutually different directions in the third direction D3, respectively, similarly to the first piece 201 and the second piece 202. The third piece 203 protrudes from one second surface 191B of the pair of second surfaces 191B of the support portion 191. Furthermore, the third piece 203 is bent, relative to the support portion 191, in a direction toward one first surface 191A of the pair of first surfaces 191A of the support portion 191. The fourth piece 204 protrudes from the other second surface 191B of the pair of second surfaces 191B of the support portion 191. Furthermore, the fourth piece 204 is bent, relative to the support portion 191, in a direction toward the other first surface 191A of the pair of first surfaces 191A of the support portion 191. In other words, in the third direction D3, the third piece 203 and the fourth piece 204 are bent in mutually different directions, respectively. Therefore, the position of the center of gravity of the support portion 191 can be changed.

For example, when the holding portion 193 holds the discharge member 192 on one first surface 191A of the pair of first surfaces 191A of the support portion 191, the position of the center of gravity of the electrode 19 can be changed by changing the bending direction of each of the third piece 203 and the fourth piece 204. As a result, it is possible to more effectively inhibit the support portion 191 from falling toward the second substrate 52.

(3) The discharge device 100 described in each of the second embodiment and the third embodiment may further include the third piece 203 and the fourth piece 204.

INDUSTRIAL APPLICABILITY

The present invention provides a discharge device, and the provided discharge device has industrial applicability.

REFERENCE SIGNS LIST

52 Second substrate (substrate)
100 Discharge device
191 Support portion
191A First surface
191B Second surface
192 Discharge member
193 Holding portion
200 Protruding piece
201 First piece
202 Second piece
203 Third piece
204 Fourth piece

The invention claimed is:

1. A discharge device comprising:
a discharge member configured to discharge when voltage is applied to the discharge member;
a support portion having a flat-plate shape and configured to support the discharge member; and
a protruding piece inclined relative to the support portion and protruding in a direction intersecting the support portion.

2. The discharge device according to claim 1,
wherein the support portion includes a holding portion configured to hold the discharge member,
the discharge member is a bundle of fibers,
the support portion includes a pair of first surfaces,
the holding portion holds the discharge member on one first surface of the pair of first surfaces, and
the protruding piece is inclined, relative to the support portion, in a direction where the discharge member is located.

3. The discharge device according to claim 2,
wherein the support portion further includes a pair of second surfaces,
the protruding piece includes a first piece and a second piece,
the first piece protrudes from one second surface of the pair of second surfaces,
the second piece protrudes from the other second surface of the pair of second surfaces, and
at least one of the first piece or the second piece is inclined, relative to the support portion, in a direction where the discharge member is located.

4. The discharge device according to claim 3,
wherein the protruding piece further includes a third piece and a fourth piece,
the third piece protrudes from one second surface of the pair of second surfaces and is located between the first piece and the discharge member, and
the fourth piece protrudes from the other second surface of the pair of second surfaces and is located between the second piece and the discharge member.

5. The discharge device according to claim 4,
wherein at least one of the third piece or the fourth piece is inclined, relative to the support portion, in a direction where the discharge member is located.

6. The discharge device according to claim 1,
wherein the discharge member extends from the support portion, and
a tip of the discharge member has a pointed shape.

* * * * *